(12) United States Patent
Xue et al.

(10) Patent No.: US 10,551,278 B2
(45) Date of Patent: Feb. 4, 2020

(54) WHEEL END FACE DETECTION AND CORRECTION DEVICE

(71) Applicant: CITIC Dicastal CO., LTD, Qinhuangdao (CN)

(72) Inventors: Bowen Xue, Qinhuangdao (CN); Yingfeng Wang, Qinhuangdao (CN); Weizhi Zhang, Qinhuangdao (CN); Jiandong Guo, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 182 days.

(21) Appl. No.: 15/940,192

(22) Filed: Mar. 29, 2018

(65) Prior Publication Data
US 2019/0195738 A1   Jun. 27, 2019

(30) Foreign Application Priority Data
Dec. 21, 2017   (CN) .......................... 2017 1 1394350

(51) Int. Cl.
| | |
|---|---|
| *G01B 5/24* | (2006.01) |
| *G01M 17/013* | (2006.01) |
| *B23Q 17/22* | (2006.01) |
| *G01M 1/04* | (2006.01) |
| *G01B 3/12* | (2006.01) |
| *G01B 5/255* | (2006.01) |
| *B25J 15/00* | (2006.01) |
| *G01B 5/00* | (2006.01) |
| *G01B 3/22* | (2006.01) |

(52) U.S. Cl.
CPC ....... *G01M 17/013* (2013.01); *B23Q 17/2258* (2013.01); *B25J 15/0047* (2013.01); *G01B 3/12* (2013.01); *G01B 3/22* (2013.01); *G01B 5/0025* (2013.01); *G01B 5/255* (2013.01); *G01M 1/045* (2013.01)

(58) Field of Classification Search
CPC .................................................. G01M 17/013
USPC ................................ 33/203, 203.12, 203.13
See application file for complete search history.

(56) References Cited

U.S. PATENT DOCUMENTS

| | | | |
|---|---|---|---|
| 2019/0033173 A1* | 1/2019 | Liu | ..................... G01M 17/021 |
| 2019/0063896 A1* | 2/2019 | Liu | ..................... G01M 17/013 |
| 2019/0193232 A1* | 6/2019 | Xue | .......................... B24B 9/00 |
| 2019/0193244 A1* | 6/2019 | Xue | ........................ B24B 51/00 |
| 2019/0224792 A1* | 7/2019 | Liu | ......................... B21D 53/30 |
| 2019/0321865 A1* | 10/2019 | Liu | .......................... B08B 1/002 |
| 2019/0321931 A1* | 10/2019 | Xue | ........................ B24B 41/06 |

* cited by examiner

*Primary Examiner* — George B Bennett
(74) *Attorney, Agent, or Firm* — Calfee, Halter & Griswold LLP

(57) ABSTRACT

Disclosed is a wheel end face detection and correction device, which includes a frame, a self-made cylinder, a detection system, a correction system and the like. A wheel is preliminarily positioned in the center, a cylinder II drives an expansion sleeve to descend to match a center hole of the wheel, the attitude of a datum plate is adjusted to attach to a flange face of the wheel, and an expansion core is pulled by a cylinder rod; the cylinder II drives the wheel to ascend, and a servo motor drives the wheel to rotate; a servo electric cylinder II drives a dial indicator to be located below a rim end face of the wheel, a servo electric cylinder I drives the dial indicator to contact an end face of the wheel, and the end face run-out of the wheel may be detected.

1 Claim, 2 Drawing Sheets

WHEEL END FACE DETECTION AND CORRECTION DEVICE

CROSS-REFERENCE TO RELATED APPLICATIONS

This application claims priority to Chinese Patent Application No. 201711394350.0 filed on Dec. 21, 2017, which is hereby incorporated by reference in its entirety.

TECHNICAL FIELD

The present application relates to a detection and correction device, and specifically, to a wheel end face detection and correction device.

BACKGROUND ART

In the machining process of an aluminum alloy wheel, the end face run-out of the machined wheel is often unqualified due to end face deformation and clamping deformation of a blank, so that the wheel vibrates in the driving process to affect the driving safety and comfort.

SUMMARY OF THE INVENTION

The aim of the present application is to provide a wheel end face detection and correction device, which may be used for detecting the end face run-out of a wheel on line and correcting the end face of the wheel on line.

In order to fulfill the above aim, the technical solution of the present application is: a wheel end face detection and correction device, includes a frame, cylinders I, guide posts I, guide sleeves I, a fixed plate, a lifting rack I, guide rails I, a guide rail II, a servo electric cylinder I, a translation rack, a guide rail III, a lifting rack II, a dial indicator, a support plate, an expansion core, an expansion sleeve, a datum plate, a cylinder rod, a piston, a cylinder body, a left profiling pressure block, a left pressure rod, a swivel, a left guide sleeve, a movable plate, a servo motor, servo electric push rods, a lifting plate, guide posts II, guide sleeves II, a left servo electric cylinder, a cylinder II, a right servo electric cylinder, a right guide sleeve, a right pressure rod, a right profiling pressure block, a servo electric cylinder II and the like, wherein the fixed plate is fixed on the frame, the four guide sleeves I are fixed on the fixed plate, and the four guide posts I matched with the guide sleeves I are fixed below the lifting rack I; the two cylinders I are also fixed on the fixed plate, and the output ends of the two cylinders I are articulated with the bottom of the lifting rack I; two sides of the lifting rack I are connected with the frame via the guide rails I; and the front and rear ends of the support plate are fixed on the frame.

A detection system includes: the bottom of the translation rack is mounted above the bottom of the lifting rack I via the guide rail II; the lifting rack II is mounted on the side of the translation rack via the guide rail III; the servo electric cylinder I is fixed on a bottom plate of the translation rack, and the output end of the servo electric cylinder I is connected with the lifting rack II; the dial indicator is mounted on the lifting rack II; the servo electric cylinder II is fixed above the bottom of the lifting rack I, and the output end of the servo electric cylinder II is connected with the translation rack.

A self-made cylinder includes: the datum plate is fixed below the cylinder body; the piston is matched with an inner hole of the cylinder body; and the cylinder rod is connected with the piston.

The expansion sleeve is fixed below the datum plate, the expansion core is fixed at the top of the cylinder rod, and the outer side of the expansion core is matched with the inner side of the expansion sleeve; the top of the cylinder body is mounted below the movable plate via the swivel; the servo motor is fixed above the movable plate, and the output end of the servo motor is connected with the top of the cylinder body; the upper ends of the three servo electric push rods are articulated with the lower end of the lifting plate, the lower ends of the three servo electric push rods are articulated with the top of the movable plate, and the three servo electric push rods are uniformly distributed between the movable plate and the lifting plate; the four guide posts II are fixed above the lifting plate, and the four guide sleeves II matched with the guide posts II are fixed at the top of the frame; the cylinder II is also fixed at the top of the frame, and the output end of the cylinder II is articulated with the top of the lifting plate.

A correction system includes: the left servo electric cylinder is fixed on the left side of the top of the frame; the left guide sleeve is fixed below the left servo electric cylinder, and matched with the left pressure rod; the top of the left pressure rod is connected with the output end of the left servo electric cylinder, and the left profiling pressure block is fixed at the lower end of the left pressure rod; the right servo electric cylinder is fixed on the right side of the top of the frame; the right guide sleeve is fixed below the right servo electric cylinder, and matched with the right pressure rod; the top of the right pressure rod is connected with the output end of the right servo electric cylinder, and the right profiling pressure block is fixed at the lower end of the right pressure rod.

In the working process, a wheel is preliminarily positioned in the center via a stopper, the cylinder II drives the expansion sleeve via the guide posts II to descend to match a center hole of the wheel, the attitude of the datum plate is adjusted via the three servo electric push rods to attach to a flange face of the wheel, the expansion core is pulled by the cylinder rod, and the wheel is tensioned; the cylinder II drives the wheel to ascend, and the servo motor drives the wheel to rotate; the servo electric cylinder II drives the dial indicator via the guide rail II to be located below a rim end face of the wheel, the servo electric cylinder I drives the dial indicator via the guide rail III to contact an end face of the wheel, the end face run-out of the wheel may be detected at this time, and the cylinders I drive the lifting rack I via the guide posts I to descend after detection; meanwhile, the cylinder II drives the end face of the wheel to attach to the support plate, and the right servo electric cylinder drives the right profiling pressure block via the right pressure rod to attach to an upper end face of one side of the wheel, but not to apply pressure; and the left servo electric cylinder drives the left profiling pressure block via the left pressure rod to press the other side of the wheel excessively, so that the lower end face descends to fulfill the aim of end face correction.

The present application may be used for detecting the end face run-out of a wheel on line and correcting the end face of the wheel on line, and simultaneously has the characteristics of high automation degree, advanced process, strong generality and safe and stable performance.

Figure 1:
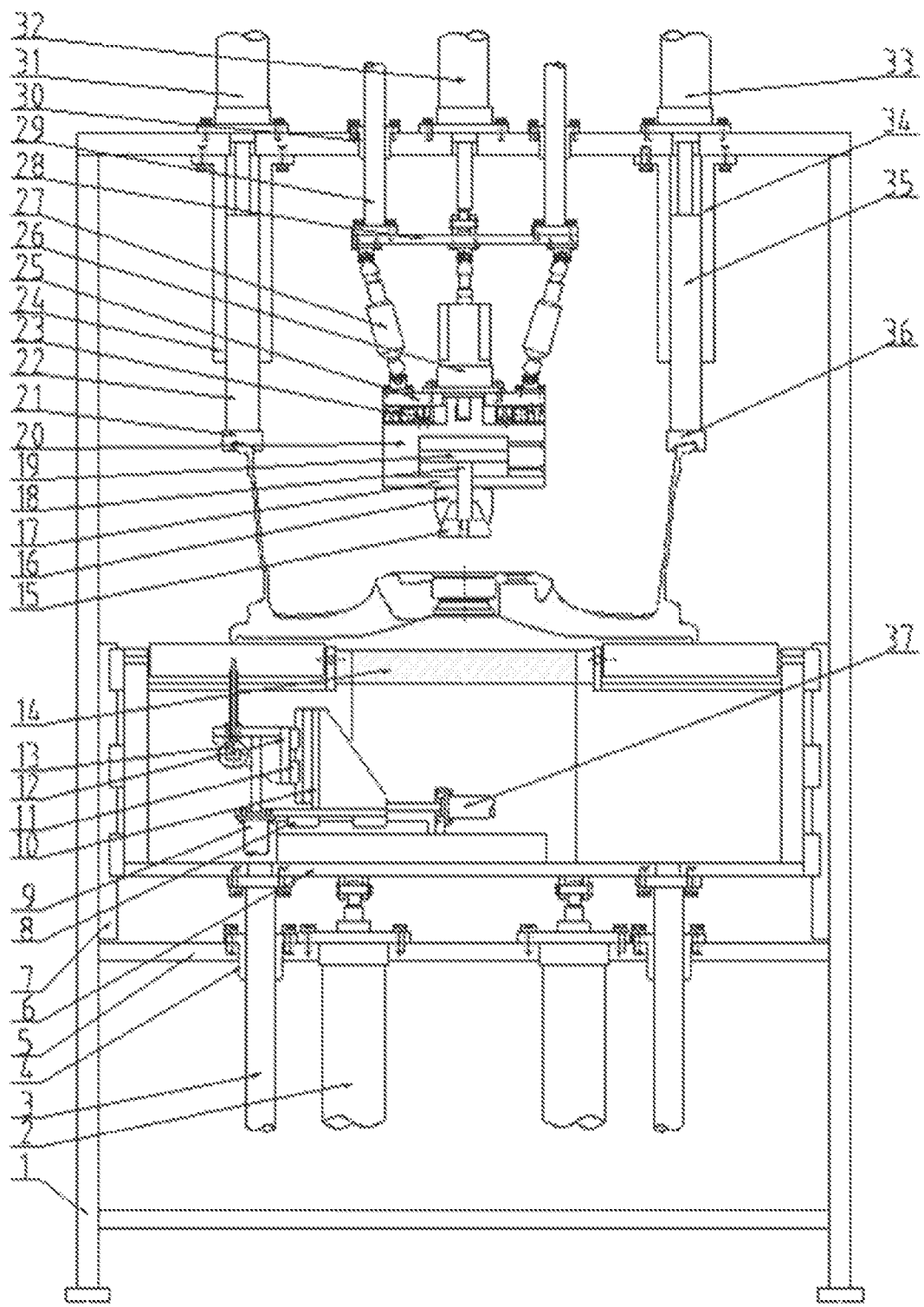
FIG. 1 is a front view of a wheel end face detection and correction device of the present application.
Figure 2:
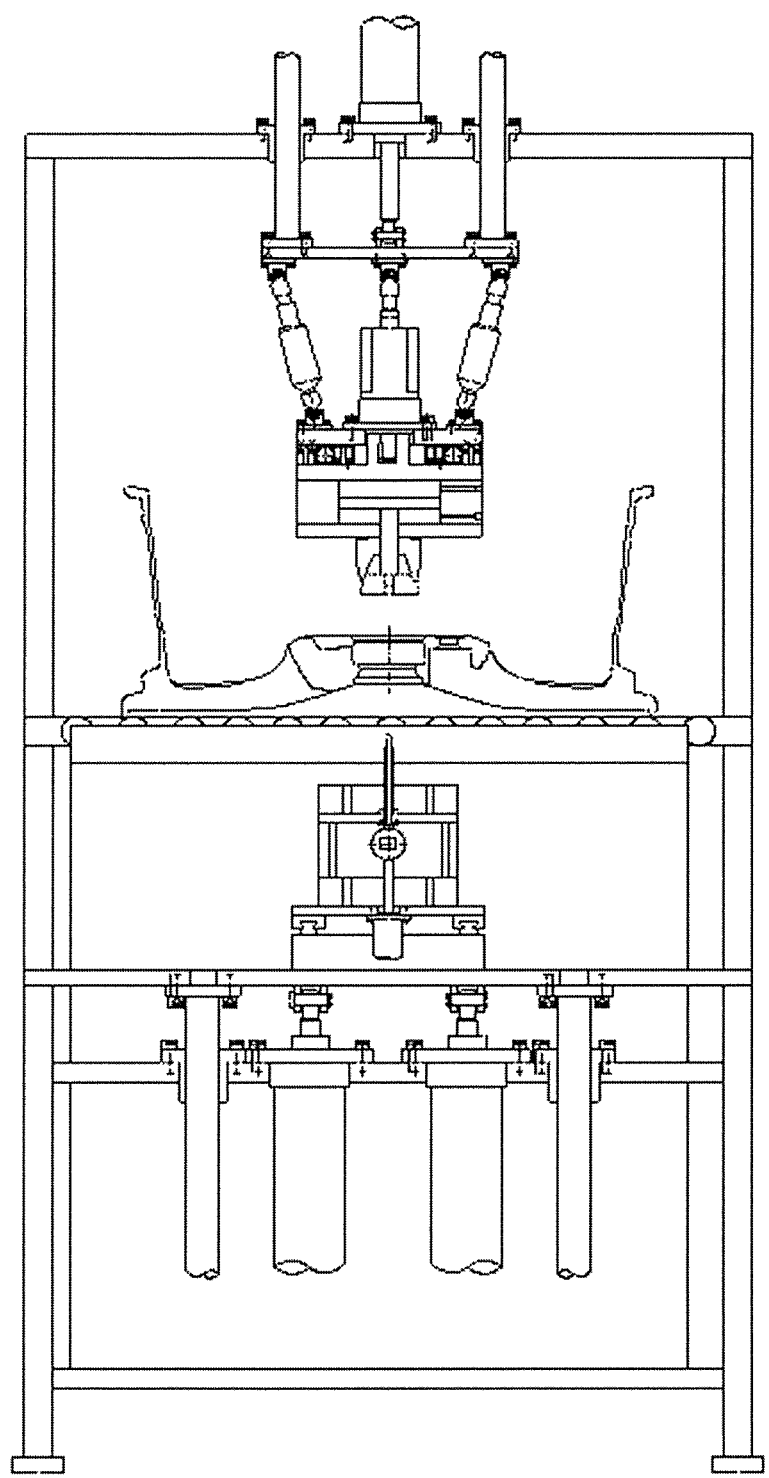
FIG. 2 is a left view of the wheel end face detection and correction device of the present application.

In which: 1-frame, 2-cylinder I, 3-guide post I, 4-guide sleeve I, 5-fixed plate, 6-lifting rack I, 7-guide rail I, 8-guide rail II, 9-servo electric cylinder I, 10-translation rack, 11-guide rail III, 12-lifting rack II, 13-dial indicator, 14-support plate, 15-expansion core, 16-expansion sleeve, 17-datum plate, 18-cylinder rod, 19-piston, 20-cylinder body, 21-left profiling pressure block, 22-left pressure rod, 23-swivel, 24-left guide sleeve, 25-movable plate, 26-servo motor, 27-servo electric push rod, 28-lifting plate, 29-guide post II, 30-guide sleeve II, 31-left servo electric cylinder, 32-cylinder II, 33-right servo electric cylinder, 34-right guide sleeve, 35-right pressure rod, 36-right profiling pressure block, 37-servo electric cylinder II.

DETAILED DESCRIPTION OF THE INVENTION

Specific details and working conditions of a device provided by the present application will be described below in combination with the accompanying drawings.

The device includes a frame 1, cylinders I 2, guide posts I 3, guide sleeves I 4, a fixed plate 5, a lifting rack I 6, guide rails I 7, a guide rail II 8, a servo electric cylinder I 9, a translation rack 10, a guide rail III 11, a lifting rack II 12, a dial indicator 13, a support plate 14, an expansion core 15, an expansion sleeve 16, a datum plate 17, a cylinder rod 18, a piston 19, a cylinder body 20, a left profiling pressure block 21, a left pressure rod 22, a swivel 23, a left guide sleeve 24, a movable plate 25, a servo motor 26, servo electric push rods 27, a lifting plate 28, guide posts II 29, guide sleeves II 30, a left servo electric cylinder 31, a cylinder II 32, a right servo electric cylinder 33, a right guide sleeve 34, a right pressure rod 35, a right profiling pressure block 36, a servo electric cylinder II 37 and the like, wherein the fixed plate 5 is fixed on the frame 1, the four guide sleeves I 4 are fixed on the fixed plate 5, and the four guide posts I 3 matched with the guide sleeves I 4 are fixed below the lifting rack I 6; the two cylinders I 2 are also fixed on the fixed plate 5, and the output ends of the two cylinders I 2 are articulated with the bottom of the lifting rack I 6; two sides of the lifting rack I 6 are connected with the frame 1 via the guide rails I 7; and the front and rear ends of the support plate 14 are fixed on the frame 1.

A detection system includes: the bottom of the translation rack 10 is mounted above the bottom of the lifting rack I 6 via the guide rail II 8; the lifting rack II 12 is mounted on the side of the translation rack 10 via the guide rail III 11; the servo electric cylinder I 9 is fixed on a bottom plate of the translation rack 10, and the output end of the servo electric cylinder I 9 is connected with the lifting rack II 12; the dial indicator 13 is mounted on the lifting rack II 12; the servo electric cylinder II 37 is fixed above the bottom of the lifting rack I 6, and the output end of the servo electric cylinder II 37 is connected with the translation rack 10.

A self-made cylinder includes: the datum plate 17 is fixed below the cylinder body 20; the piston 19 is matched with an inner hole of the cylinder body 20; and the cylinder rod 18 is connected with the piston 19.

The expansion sleeve 16 is fixed below the datum plate 17, the expansion core 15 is fixed at the top of the cylinder rod 18, and the outer side of the expansion core 15 is matched with the inner side of the expansion sleeve 16; the top of the cylinder body 20 is mounted below the movable plate 25 via the swivel 23; the servo motor 26 is fixed above the movable plate 25, and the output end of the servo motor 26 is connected with the top of the cylinder body 20; the upper ends of the three servo electric push rods 27 are articulated with the lower end of the lifting plate 28, the lower ends of the three servo electric push rods 27 are articulated with the top of the movable plate 25, and the three servo electric push rods 27 are uniformly distributed between the movable plate 25 and the lifting plate 28; the four guide posts II 29 are fixed above the lifting plate 28, and the four guide sleeves II 30 matched with the guide posts II 29 are fixed at the top of the frame 1; the cylinder II 32 is also fixed at the top of the frame 1, and the output end of the cylinder II 32 is articulated with the top of the lifting plate 28.

A correction system includes: the left servo electric cylinder 31 is fixed on the left side of the top of the frame 1; the left guide sleeve 24 is fixed below the left servo electric cylinder 31, and matched with the left pressure rod 22; the top of the left pressure rod 22 is connected with the output end of the left servo electric cylinder 31, and the left profiling pressure block 21 is fixed at the lower end of the left pressure rod 22; the right servo electric cylinder 33 is fixed on the right side of the top of the frame 1; the right guide sleeve 34 is fixed below the right servo electric cylinder 33, and matched with the right pressure rod 35; the top of the right pressure rod 35 is connected with the output end of the right servo electric cylinder 33, and the right profiling pressure block 36 is fixed at the lower end of the right pressure rod 35.

In the working process, a wheel is preliminarily positioned in the center via a stopper, the cylinder II 32 drives the expansion sleeve 16 via the guide posts II 29 to descend to match a center hole of the wheel, the attitude of the datum plate 17 is adjusted via the three servo electric push rods 27 to attach to a flange face of the wheel, the expansion core 15 is pulled by the cylinder rod 18, and the wheel is tensioned; the cylinder II 32 drives the wheel to ascend, and the servo motor 26 drives the wheel to rotate; the servo electric cylinder II 37 drives the dial indicator 13 via the guide rail II 8 to be located below a rim end face of the wheel, the servo electric cylinder I 9 drives the dial indicator 13 via the guide rail III 11 to contact an end face of the wheel, the end face run-out of the wheel may be detected at this time, and the cylinders I 2 drive the lifting rack I 6 via the guide posts I 3 to descend after detection; meanwhile, the cylinder II 32 drives the end face of the wheel to attach to the support plate 14, and the right servo electric cylinder 33 drives the right profiling pressure block 36 via the right pressure rod 35 to attach to an upper end face of one side of the wheel, but not to apply pressure; and the left servo electric cylinder 31 drives the left profiling pressure block 21 via the left pressure rod 22 to press the other side of the wheel excessively, so that the lower end face descends to fulfill the aim of end face correction.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel end face detection and correction device, comprising a frame, cylinders I, guide posts I, guide sleeves I, a fixed plate, a lifting rack I, guide rails I, a guide rail II, a servo electric cylinder I, a translation rack, a guide rail III, a lifting rack II, a dial indicator, a support plate, an expansion core, an expansion sleeve, a datum plate, a cylinder rod, a piston, a cylinder body, a left profiling pressure block, a left pressure rod, a swivel, a left guide sleeve, a movable plate, a servo motor, servo electric push rods, a lifting plate, guide posts II, guide sleeves II, a left servo electric cylinder, a cylinder II, a right servo electric cylinder, a right guide sleeve, a right pressure rod, a right profiling pressure block and a servo electric cylinder II, wherein the fixed plate is fixed on the frame, the four guide sleeves I are fixed on the fixed plate, and the four guide posts I matched with the guide sleeves I are fixed below the lifting rack I; the two cylinders I are also fixed on the fixed plate, and the output ends of the two cylinders I are articulated with the bottom of the lifting rack I; two sides of the lifting rack I are connected with the frame via the guide rails I; the front and rear ends of the support plate are fixed on the frame;

- a detection system comprises: the bottom of the translation rack is mounted above the bottom of the lifting rack I via the guide rail II; the lifting rack II is mounted on the side of the translation rack via the guide rail III; the servo electric cylinder I is fixed on a bottom plate of the translation rack, and the output end of the servo electric cylinder I is connected with the lifting rack II; the dial indicator is mounted on the lifting rack II; the servo electric cylinder II is fixed above the bottom of the lifting rack I, the output end of the servo electric cylinder II is connected with the translation rack;
- a self-made cylinder comprises: the datum plate is fixed below the cylinder body; the piston is matched with an inner hole of the cylinder body; the cylinder rod is connected with the piston; the expansion sleeve is fixed below the datum plate, the expansion core is fixed at the top of the cylinder rod, and the outer side of the expansion core is matched with the inner side of the expansion sleeve; the top of the cylinder body is mounted below the movable plate via the swivel; the servo motor is fixed above the movable plate, and the output end of the servo motor is connected with the top of the cylinder body; the upper ends of the three servo electric push rods are articulated with the lower end of the lifting plate, the lower ends of the three servo electric push rods are articulated with the top of the movable plate, and the three servo electric push rods are uniformly distributed between the movable plate and the lifting plate; the four guide posts II are fixed above the lifting plate, and the four guide sleeves II matched with the guide posts II are fixed at the top of the frame; the cylinder II is also fixed at the top of the frame, and the output end of the cylinder II is articulated with the top of the lifting plate;
- a correction system comprises: the left servo electric cylinder is fixed on the left side of the top of the frame; the left guide sleeve is fixed below the left servo electric cylinder, and matched with the left pressure rod; the top of the left pressure rod is connected with the output end of the left servo electric cylinder, and the left profiling pressure block is fixed at the lower end of the left pressure rod; the right servo electric cylinder is fixed on the right side of the top of the frame; the right guide sleeve is fixed below the right servo electric cylinder, and matched with the right pressure rod; the top of the right pressure rod is connected with the output end of the right servo electric cylinder, and the right profiling pressure block is fixed at the lower end of the right pressure rod.

* * * * *